(12) United States Patent
Olsson et al.

(10) Patent No.: US 12,524,264 B2
(45) Date of Patent: Jan. 13, 2026

(54) INTERRUPT MANAGEMENT

(71) Applicant: Nordic Semiconductor ASA, Trondheim (NO)

(72) Inventors: Martin Olof Olsson, Trondheim (NO); Frode Milch Pedersen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 85 days.

(21) Appl. No.: 18/577,065

(22) PCT Filed: Jul. 7, 2022

(86) PCT No.: PCT/EP2022/068989
§ 371 (c)(1),
(2) Date: Jan. 5, 2024

(87) PCT Pub. No.: WO2023/281015
PCT Pub. Date: Jan. 12, 2023

(65) Prior Publication Data
US 2024/0311178 A1   Sep. 19, 2024

(30) Foreign Application Priority Data
Jul. 7, 2021  (GB) ...................................... 2109810

(51) Int. Cl.
*G06F 9/48* (2006.01)
*G06F 1/28* (2006.01)

(52) U.S. Cl.
CPC .............. *G06F 9/4825* (2013.01); *G06F 1/28* (2013.01)

(58) Field of Classification Search
CPC ................................ G06F 9/4825; G06F 1/28
See application file for complete search history.

(56) References Cited

U.S. PATENT DOCUMENTS 6,463,492 B1 * 10/2002 Engfer .................. G06F 9/4812
                                                          710/260
8,464,281 B2 *  6/2013 Mebane, III ............ G06F 9/542
                                                          717/124
(Continued)

FOREIGN PATENT DOCUMENTS

WO    WO 2020/002423 A1    1/2020

OTHER PUBLICATIONS

International Search Report and Written Opinion for PCT/EP2022/068989, mailed Oct. 13, 2022, 19 pages.
(Continued)

*Primary Examiner* — Henry Tsai
*Assistant Examiner* — Aurangzeb Hassan
(74) *Attorney, Agent, or Firm* — Klarquist Sparkman, LLP

(57) ABSTRACT

A circuit portion comprises a mapping module, a source component, a destination component and a memory. The mapping module comprises a plurality of channels that each provides a connection for connecting two components of the circuit portion in a one-to-one relationship. The source component is arranged in a first clock or power domain, and the destination component is arranged in a second clock or power domain. In response to an assertion of an event signal or an interrupt by the source component, the mapping module is configured to forward the event signal or interrupt to the destination component via only one channel of the plurality of channels so as to cause the destination component to perform a corresponding task according to a mapping stored in the memory.

20 Claims, 6 Drawing Sheets

(56) References Cited

U.S. PATENT DOCUMENTS

| 9,141,494 B2* | 9/2015 | Arroyo | G06F 13/4027 |
| 2012/0131309 A1* | 5/2012 | Johnson | G06F 9/323 |
| | | | 712/E9.004 |
| 2017/0308488 A1* | 10/2017 | Hindle | G06F 13/24 |
| 2019/0018815 A1* | 1/2019 | Fleming | G06F 9/5027 |
| 2021/0034442 A1* | 2/2021 | Nore | G06F 15/17 |
| 2021/0390004 A1* | 12/2021 | Kundu | G06F 9/545 |

OTHER PUBLICATIONS

IPO Combined Search and Examination Report under Sections 17 and 18(3), dated Apr. 4, 2022, 13 pages.

* cited by examiner

INTERRUPT MANAGEMENT

CROSS REFERENCE TO RELATED APPLICATIONS

This is the U.S. National Stage of International Application No. PCT/EP2022/068989, filed Jul. 7, 2022, which was published in English under PCT Article 21(2), which in turn claims the benefit of Great Britain Application No. 2109810.8, filed Jul. 7, 2021.

BACKGROUND OF THE INVENTION

The present invention relates to systems for communicating between clock or power domains in integrated-circuit devices.

An integrated-circuit device may comprise a number of domains, which may contain any one or more of a processor, memory and peripherals. Examples of peripherals include a timer, a cryptographic encryption engine, a serial interface (UART), and an embedded radio transceiver. Different domains may be asynchronous in terms of their clocking relationship (i.e. they may be clocked by clock sources that are operating out of phase) or may be independent in terms of their power state (i.e. they may be powered on or off independently).

Communication between two peripherals can be provided by a peripheral-to-peripheral communication system, which allows a first peripheral to signal a single-cycle event to a second peripheral, so as to cause the second peripheral to perform a task in response to the event of the first peripheral. It can also be useful for different processors in an integrated-circuit device to communicate with each other directly and asynchronously using simple signals. Processors may also be configured to perform a task in response to the assertion of an interrupt request by a peripheral.

Owing to the complexity of modern integrated-circuits, hardwiring connections between domains to facilitate such communications can quickly become highly complex. Therefore, the Applicant has identified that there is a need for an improved system of providing communication between domains.

SUMMARY OF THE INVENTION

From a first aspect, the invention provides a circuit portion comprising:
- a mapping module, comprising a plurality of channels wherein each channel provides a connection for connecting a respective first component of the circuit portion with a respective second component of the circuit portion in a one-to-one relationship;
- a source component, arranged in a first clock or power domain, configured to assert an event signal or an interrupt from a set of event signals or interrupts;
- a destination component, arranged in a second clock or power domain, configured to execute a task from a set of tasks; and
- a memory storing a mapping between the set of event signals or interrupts and the set of tasks;
- wherein the mapping module is configured, in response to an assertion of an event signal or interrupt by the source component, to forward the event signal or interrupt to the destination component via only one channel of the plurality of channels so as to cause the destination component to perform a corresponding task according to the mapping stored in the memory.

Thus it will be seen that in accordance with the invention there is provided a circuit portion that is configured to facilitate communication between domains. A mapping module is provided that is configured to use a mapping between signals asserted in a first domain (event signals or interrupts) and a task to be performed in a second domain. The mapping module is configured to forward an event signal from the source component to the destination component via only a single channel, to cause the destination component to perform the task. This makes the establishment of the appropriate connections simpler and more secure, and is much more flexible than previous approaches.

The event or interrupt signals may be end-to-end (e.g. point-to-point) signals that are targeted so as to have only a single source and a single destination, the signals being inaccessible to other components (other than, in some examples, intermediate components such as relays).

The use of (e.g. end-to-end) event signals or interrupts sent over a single channel according to a one-to-one relationship is distinguished over conventional systems in which an event signal is broadcast by a source component to a plurality of destination components, rather than to a single targeted destination component. This can be inefficient, especially in implementations in which acknowledgement signals are required to be received by the source component before a task is performed. As the latest acknowledgement signal may be received some time after the event signal or interrupt is issued, it will be appreciated that response time may be significantly affected in such conventional systems when substantial delays exist between components. Furthermore, such an arrangement can have negative security implications, as an event signal or interrupt may be detected by a component that is not the intended recipient, and that may be under the control of a malicious party.

The mapping module is preferably distinct from the source component and the destination component.

In some embodiments, the circuit portion is arranged on an integrated-circuit (IC), such as a system-on-chip (SoC), e.g. a radio-on-a-chip.

The event signal or interrupt may be asserted in response to any input, change of state, satisfying of a criterion, etc., as will be familiar to one skilled in the art—for example, when a timer reaches a target value. The event signal may comprise a single-cycle (e.g. peripheral-to-peripheral) signal. The task may be any function or operation which can be performed by the destination component, e.g. transmitting data over an interface.

The first and second clock or power domains may be the same domain, but typically the second clock or power domain is different to the first clock or power domain. The first clock domain and the second clock domain may be asynchronous.

The source component and/or the destination component may comprise a processor (e.g. a central processing unit (CPU)) or peripheral device. The source component may comprise a source peripheral-to-peripheral communication system, configured to provide one or more channels for communication between peripheral devices in the first domain. The destination component may comprise a destination peripheral-to-peripheral communication system, configured to provide one or more channels for communication between peripheral devices in the second domain.

In some embodiments, the source component comprises a dedicated source component for communicating with or via the mapping module. The second domain may comprise a similar dedicated destination component.

The dedicated destination component referred to above may be configured to detect the assertion of the event signal or interrupt. The dedicated destination component may be configured to instruct the component in the destination domain configured to perform the task (referred to herein as the "destination component"), to perform said task in response to detecting the assertion of the event signal or interrupt.

The source component may comprise one or more source channels on which the event signal or interrupt may be asserted. The destination component may comprise one or more sink channels. Each source channel of the source component may be associated with a respective event signal from the set of event signals. Each sink channel of the destination component may be associated with a respective task from the set of tasks. The one or more source channels may be connected to the mapping module e.g. by an input multiplexer. The one or more sink channels may be connected to the mapping module e.g. by an output multiplexer.

The source component may be configured to assert the event signal or interrupt in response to receiving an initiating event signal or interrupt from a further device in the first domain (e.g. a CPU or peripheral). Thus the source component may be an event "consumer". The source component may comprise an event register, wherein the source component is configured to assert the event signal or interrupt in response to a change in the event register. The source component may comprise a plurality of event registers, wherein each event register is associated with a respective event signal or interrupt of the set of event signals or interrupts. This means that a component, e.g. in the first domain, can trigger the assertion of different event signals or interrupts by writing to respective event registers.

In some embodiments, the destination component is configured to assert an acknowledgement signal in response to the assertion of the event signal or interrupt. The acknowledgement signal may be generic or it may be associated with a respective event signal, interrupt or task. In some embodiments, the source component is configured to detect an assertion of the acknowledgment signal. The source component may be configured, once it has asserted the event signal or interrupt, to continue to assert the event signal or interrupt until the acknowledgement signal is detected. In some embodiments, the source component is configured to de-assert the event signal or interrupt in response to an assertion of the acknowledgement signal.

The destination component may be configured to de-assert the acknowledgement signal in response to a de-assertion of the event signal or interrupt. In some embodiments, the source component is prevented from asserting a further event signal or interrupt until an assertion (or assertion and de-assertion) of an acknowledgement signal (e.g. asserted in response to a former event signal or interrupt) has been detected.

The circuit portion may be configured to store a value (e.g. in an overflow register) or to output an alert in response to an attempt by the source component to assert a further event signal or interrupt before an assertion (or assertion and de-assertion) of the acknowledgement signal has been detected. This can allow a user to debug scenarios in which event signals or interrupts may be being asserted too frequently for the destination component to deal with, for example.

The destination component may comprise a destination synchroniser circuit configured to synchronise the event signal to the clock of the second domain. The source component may comprise a source synchroniser circuit configured to synchronise an acknowledgement signal to the clock of the first domain.

In some embodiments, the source component and/or the destination component is a peripheral-to-peripheral communication system, i.e. configured to provide one or more channels for communication between peripheral devices. The source component may comprise a source peripheral-to-peripheral communication system connected to a plurality of peripheral devices in the first clock or power domain. The destination component may comprise a destination peripheral-to-peripheral communication system connected to a plurality of peripheral devices in the second clock or power domain.

This is considered to be novel and inventive in its own right. Thus, from a further aspect, the invention provides a circuit portion for communicating between two peripheral-to-peripheral communication systems, the circuit portion comprising:
  a first peripheral-to-peripheral communication system, configured to provide a source peripheral-to-peripheral communication system channel to a first peripheral configured to assert an event signal from a set of event signals;
  a second peripheral-to-peripheral communication system, configured to provide a sink peripheral-to-peripheral communication system channel to a second peripheral configured to perform a set of tasks;
  a first bridging module, connected to the first peripheral-to-peripheral communication system;
  a second bridging module, connected to the second peripheral-to-peripheral communication system; and
  a memory storing a mapping between the set of event signals and the set of tasks;
wherein:
  the first bridging module and the second bridging module are connected by a plurality of bridging channels;
  the first peripheral-to-peripheral communication system is configured, upon receipt of an event signal on the source peripheral-to-peripheral communication system channel, to output the event signal to the first bridging module; and
  the first bridging module and the second bridging module are configured, in response to the first bridging module receiving the event signal, to connect the source channel and the sink channel to only one bridging channel of the plurality of bridging channels in a one-to-one relationship according to the mapping stored in the memory.

The first peripheral-to-peripheral communication system and the second peripheral-to-peripheral communication system may be arranged in the same clock or power domain. In some embodiments, the first peripheral-to-peripheral communication system is arranged in a first clock or power domain, and the second peripheral-to-peripheral communication system is arranged in a second (separate) clock or power domain.

The first bridging module may be arranged in the first clock or power domain. The second bridging module may be arranged in the second clock or power domain.

The first bridging module may be configured, in response to receiving the event signal, to raise a request to power on the second power domain (e.g. according to the mapping stored in memory). The first bridging module may be configured to lower the power request in response to an assertion (or an assertion and de-assertion) of an acknowledgement signal. Owing to the one-to-one nature of the bridging channel, a power request need only be raised in respect of the second power domain, rather than in respect of all power domains that may be connected to the first peripheral-to-peripheral communication system (as would be the case in conventional broadcast-based systems). This can help to avoid unnecessary power-up of power domains, thereby increasing the efficiency of the circuit portion.

The circuit portion may comprise one or more bridging channels for connecting the source channel and the sink channel.

The first bridging module may be configured to output a request signal to the second bridging module in response to receiving the event signal. The request signal may be a peripheral-to-peripheral communication signal. The request signal may be output on a bridging channel between the first bridging module and the second bridging module. The second bridging module may be configured to assert an instructing signal in response to receiving the request signal. The instructing signal may be a peripheral-to-peripheral communication (e.g. event) signal. The second peripheral-to-peripheral communication system may be configured, (e.g. in response to detecting the instructing signal), to cause the second peripheral to perform a task corresponding to the event signal according to the mapping stored in memory.

The second bridging module may be configured to assert an acknowledgement signal in response to receiving the request signal. The first bridging module may be configured to detect an assertion of the acknowledgement signal. The first bridging module may be configured, once it has asserted the request signal, to continue to assert the request signal until the acknowledgement signal is detected. The first bridging module may be configured to de-assert the request signal in response to an assertion of the acknowledgement signal.

The second bridging module may be configured to de-assert the acknowledgement signal in response to a de-assertion of the request signal. In some embodiments, the first bridging module is prevented from asserting a further request signal until an assertion (or assertion and de-assertion) of an acknowledgement signal (e.g. asserted in response to a former request signal) has been detected.

The circuit portion may be configured to store a value (e.g. in an overflow register) or to output an alert in response to an attempt by the first bridging module to assert a further request signal before an assertion (or assertion and de-assertion) of the acknowledgement signal has been detected.

The second bridging module may comprise a destination synchroniser circuit configured to synchronise the request signal to the clock of the second domain. The first bridging module may comprise a source synchroniser circuit configured to synchronise an acknowledgement signal to the clock of the first domain.

The first bridging module and/or the second bridging module may be configured to determine an owner identification associated with a configuration request to configure the mapping stored in memory. The first bridging module and/or the second bridging module may be configured to allow a configuration request in response to determining that an owner identification associated with the first peripheral-to-peripheral communication system is the same as an owner identification associated with the second peripheral-to-peripheral communication system.

It will be appreciated that the first and second bridging modules may together be considered to perform a similar function to that of a mapping module, as described herein. Thus, wherever appropriate, features of the mapping module described herein may be applied to the first and/or second bridging modules, and vice versa.

In some embodiments of any aspect described herein, the mapping module comprises the memory storing the mapping. The circuit portion may comprise one or more configuration registers comprising the memory storing the mapping. Each configuration register may contain a respective mapping between an event signal or interrupt and a task, e.g. between a source channel and a respective sink channel. Each configuration register may correspond to a source component and a respective destination component.

In some embodiments, the mapping is configurable. The mapping may be configurable such that the event signal or interrupt can be mapped to a different task.

In some embodiments, the mapping module is configured to connect a source channel of the source component to a sink channel of the destination component e.g. in response to the assertion of the event signal or interrupt. This may be performed on powering-up of the circuit portion.

In some embodiments, the mapping module causing the destination component to perform the task according to the mapping may comprise allowing the event signal or interrupt to propagate between the source component and the destination component (e.g. from a source channel to a connected sink channel).

The mapping module may be arranged in the first clock or power domain or the second clock or power domain. However, in some embodiments the mapping module is arranged in a third clock or power domain, separate to the first and second clock or power domains. Preferably the mapping module is arranged in a domain that is powered whenever the first clock or power domain is powered. This means that the mapping module can be available to cause the destination component to perform the corresponding task whenever the source component is able to assert the event signal.

The mapping module may comprise an input multiplexer connected to the source component. The mapping module may comprise an output multiplexer connected to the destination component.

Preferably the mapping module is arranged in a secure domain. The secure domain may comprise a secure configuration component (e.g. a processor). The secure configuration component may have permission to configure the mapping stored in memory. Preferably the memory storing the mapping is arranged in the secure domain. The secure configuration component may be configured to receive one or more configuration requests from one or more components in a (non-secure) domain (e.g. the first clock or power domain or the second clock or power domain) to configure the mapping stored in memory. The secure configuration component may be configured to execute the configuration requests by configuring the mapping stored in memory on behalf of the non-secure domain component(s).

The secure configuration component may be configured to allow or to deny configuration requests according to an owner identification associated with a configuration request (i.e. identifying the owner of the non-secure domain). The secure configuration component may be configured to allow a configuration request in response to determining that an owner of the first clock or power domain is the same as an owner of the second clock or power domain. The secure configuration component may be configured to allow a configuration request in response to determining that an owner identification associated with a configuration request is the same as an owner identification associated with the first clock or power domain and/or an owner of the second clock or power domain Embodiments of the invention therefore allow a system designer to partition resources between CPUs (e.g. between third party developers and IC manufacturers), without requiring peripherals to have hardcoded owner CPUs. This improves flexibility in scenarios in which multiple mutually untrusted code development entities are sharing the same chip.

The mapping module may comprise one or more unidirectional channels for connecting the source component and the destination component.

The mapping module may be configured, in response to the assertion of the event signal or interrupt, to raise a request to power on the second domain (e.g. according to the mapping stored in memory). The mapping module may be configured to lower the power request in response to an assertion (or an assertion and de-assertion) of an acknowledgement signal.

Thus, as described above embodiments of the present invention allow event signals or interrupts to be communicated between asynchronous clock domains or separate power domains. This means that large clock or power domains (containing a large number of components) are not required, leading to potentially significant power consumption reductions. The present invention can also help to reduce leakage current by allowing unused portions of the IC to be powered down when not needed. This is particularly useful in more complex devices with a large number of peripherals, so devices can be scaled up (i.e. be made more complex) without necessarily dramatically increasing power requirements.

In some embodiments, the mapping module is configured to prevent one or more further destination components from receiving the event signal or interrupt. The one or more further destination components may be arranged in the second domain or in a separate domain. This can help to ensure that communications between domains, which may have different owners, are secure.

When viewed from a further aspect, the invention provides a circuit portion comprising:
  a source component, arranged in a first clock or power domain, configured to assert an event signal or an interrupt from a set of event signals or interrupts;
  a destination component, arranged in a second clock or power domain, configured to execute a task from a set of tasks;
  a memory storing a mapping between the set of event signals or interrupts and the set of tasks; and
  a mapping module configured, in response to an assertion of an event signal or interrupt by the source component, to cause the destination component to perform a corresponding task according to the mapping stored in the memory.

When viewed from a further aspect, the invention provides a circuit portion for communicating between two peripheral-to-peripheral communication systems, the circuit portion comprising:
  a first peripheral-to-peripheral communication system, configured to provide a source peripheral-to-peripheral communication system channel to a first peripheral configured to assert an event signal from a set of event signals;
  a second peripheral-to-peripheral communication system, configured to provide a sink peripheral-to-peripheral communication system channel to a second peripheral configured to perform a set of tasks;
  a first bridging module, connected to the first peripheral-to-peripheral communication system;
  a second bridging module, connected to the second peripheral-to-peripheral communication system; and
  a memory storing a mapping between the set of event signals and the set of tasks;
wherein:
  the first peripheral-to-peripheral communication system is configured, upon receipt of an event signal on the source peripheral-to-peripheral communication system channel, to output the event signal to the first bridging module; and
  the first bridging module and the second bridging module are configured, in response to the first bridging module receiving the event signal, to connect the source channel and the sink channel according to the mapping stored in the memory.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Embodiments of the invention will now be described, by way of non-limiting example only, with reference to the accompanying drawings in which.

DETAILED DESCRIPTION OF THE DRAWINGS

Figure 1:
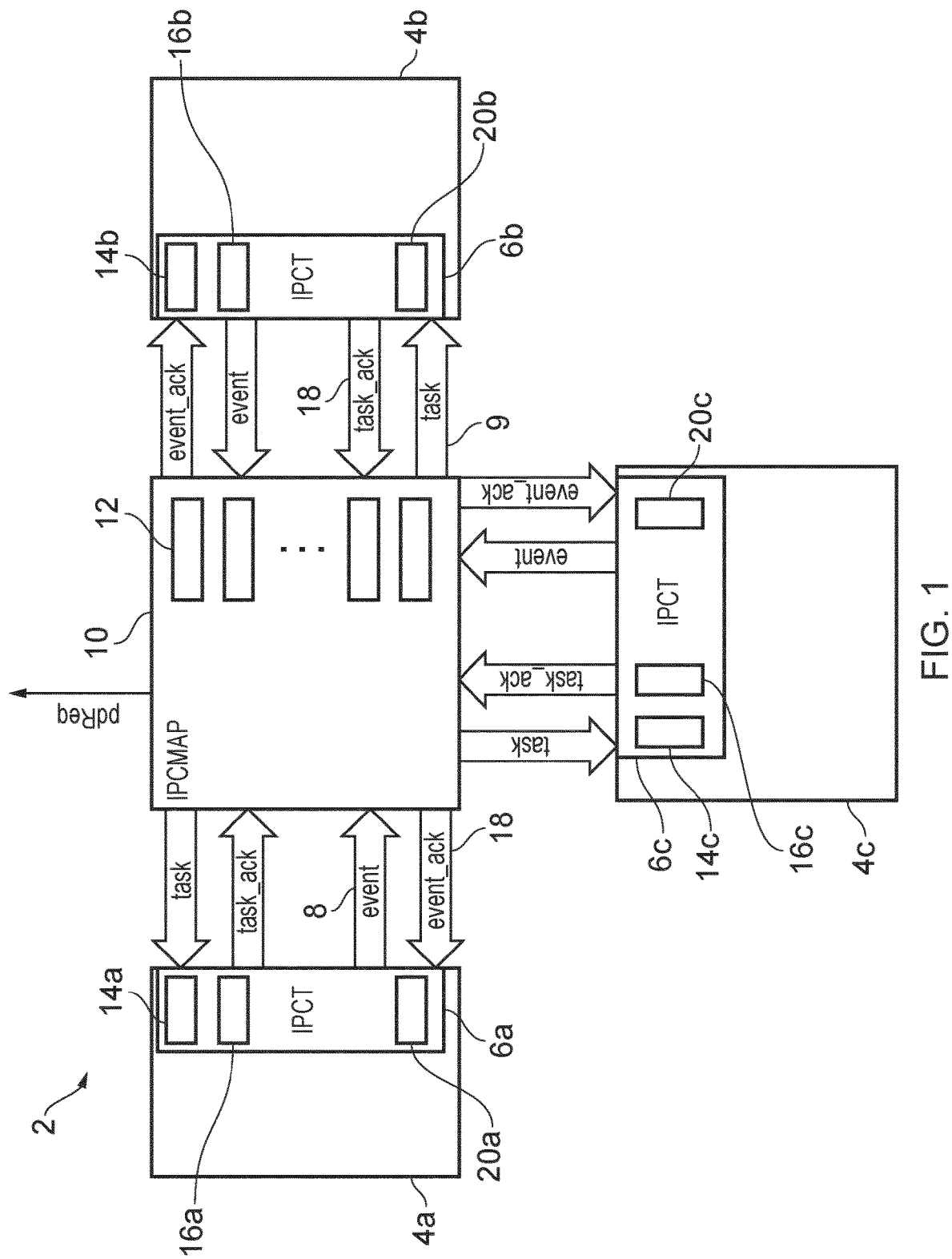
FIG. 1 is a schematic of an Inter-Processor Communication (IPC) system in accordance with an embodiment of the present invention.

FIG. 1 shows a schematic of an Inter-Processor Communication (IPC) system in accordance with an embodiment of the present invention.

The system 2 is arranged on an integrated circuit (IC) and comprises a first domain 4a, a second domain 4b, and a third domain 4c, each comprising at least one respective CPU (not shown). Each of the domains 4a-c comprises one or more respective IPC transceiver (IPCT) peripherals 6a-c, which are used to send and receive asynchronous signals (IPC events/tasks) between the respective CPUs of the domains 4a-c in the system 2. Each IPCT 6a-c has a set of source and sink channels that can be connected from one domain 4a-c to another for sending/receiving end-to-end IPC event signals 8 and task signals 9. An IPC event 8 does not contain any data itself, but is used to signal to other portions 4a-c that something has occurred. This may trigger the execution of an IPC task 9 in the respective CPUs of the receiving domain 4a-c.

A source channel of one IPCT 6a-c can be connected to a sink channel of another IPCT 6a-c, thus forming an IPC connection. The connection of each IPCT source channel and IPCT sink channel is handled by a mapping module 10 (IPCMAP). For example, the mapping module 10 may be configured to connect domains 4*a* and 4*b* by mapping a one-to-one connection between IPCT 6*a* and IPCT 6*b*. The mapping module 10 is a global resource, located in a separate domain of the IC, and is powered whenever the system 2 is in the ON state. This means that, whenever an IPCT 6*a-c* is powered and is thus able to send IPC events 8, the mapping module 10 is also powered.

The mapping module 10 comprises a plurality of configuration registers 12, each corresponding to a respective channel provided by the mapping module 10. The configuration registers 12 define which IPCT 6*a-c* is connected to the input of the channel, and to which IPCT 6*a-c* the output of the channel is connected. By modifying the configuration registers 12 of the mapping module 10, a connection can be made between any two IPCTs 6*a-c*. Each IPCT 6*a-c* comprises event registers 14*a-c*, for latching incoming IPC tasks 9, and status registers 16*a-c*, for storing the "acknowledge" status of the latched tasks 9, as will be described in more detail below.

There is a one-to-one correspondence between IPC event/task signals 8, 9 and respective channels of the mapping module 10, meaning that an IPCT source channel cannot be mapped to multiple IPCT sink channels. However, multiple connections between two domains 4*a-c* can be achieved using multiple source and sink channels. A particular IPCT 6*a-c* may be mapped to a plurality of other IPCTs 6*a-c* in a many-to-one relationship, and vice versa.

The number of IPCTs 6*a-c* in the system 2, and the number of events/tasks 8, 9 that are sent or received by each IPCT 6*a-c*, can be significantly high. Therefore, the mapping module 10 may be configured in such a way as to limit the total number of connection possibilities, e.g. by hardcoding some connections at design-time. For example, a particular IPCT 6*a-c* may require connections only to one other IPCT 6*a-c*. In this case, design parameters may be selected so that connections to other IPCTs 6*a-c* from the particular IPCT 6*a-c* are not available.

One of the domains 4*a* is a Secure Domain 4*a* that is solely responsible for configuring the configuration registers 12 of the mapping module 10. The configuration of the mapping module 10 is set by the Secure Domain 4*a* at boot time. If a different domain 4*b*, 4*c* needs to modify a configuration register 12 of the mapping module 10, a service request is sent to the Secure Domain 4*a* and, if approved, the Secure Domain 4*a* performs the reconfiguration of the configuration register 12 on behalf of the requesting domain 4*b*, 4*c*.

The domains 4*a-c* of the system 2 are arranged in separate power domains, meaning that the target domain 4*a-c* of an IPC signal 8, 9 may be powered down when the IPC signal 8, 9 is issued. Furthermore, the domains 4*a-c* may additionally or alternatively be arranged in separate asynchronous clock domains. Thus, a handshaking protocol is implemented in order to facilitate IPC communication within the system 2. As will be described, this includes raising a request for a destination power domain to be powered on.

Figure 2:
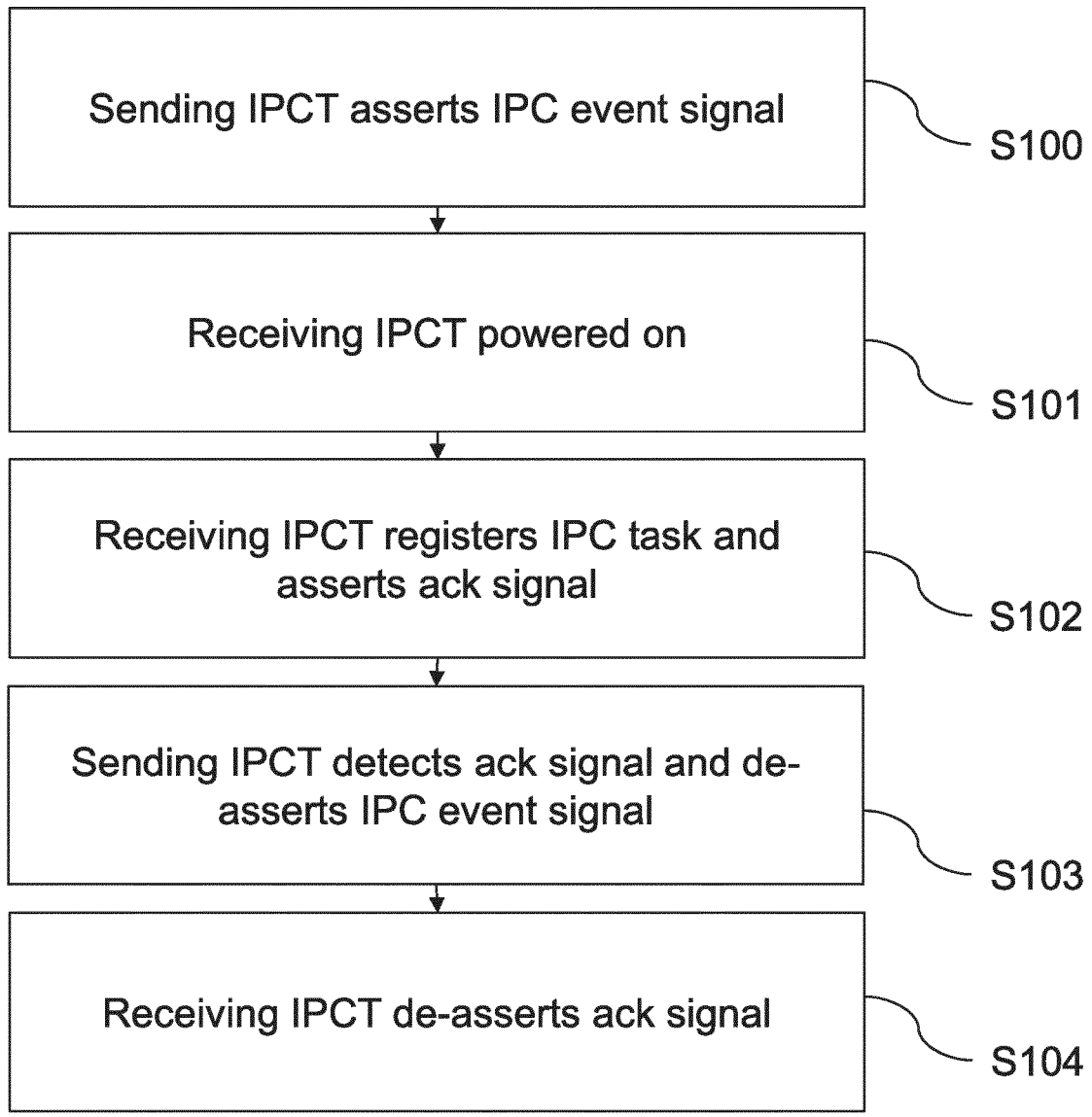
FIG. 2 is a flowchart illustrating the IPC process performed by the system of FIG. 1.

Inter-Processor Communication (IPC) between respective CPUs in domain 4*a* and domain 4*b*, including the handshaking protocol, is illustrated in the flowchart of FIG. 2.

In step S100, the CPU of a first domain 4*a* writes to the event register 14*a* of IPCT 6*a* that corresponds to an IPC event 8 to be signalled to the IPCT 6*b* of a second domain 4*b*. Separate IPC event registers 14*a* are provided for each IPC event 8 that the first domain 4*a* implements, so the CPU can write to each of them separately in order to signal different events 8. The IPC event signal 8 is provided to the input of a channel of the mapping module 10, and the status register 16*a* corresponding to the IPC event signal 8 is set to '0', indicating that an acknowledgement (event_ack) 18 from the receiving IPCT 6*b* has not yet been received. According to the mapping stored in the configuration registers 12 of the mapping module 10, an IPC task signal 9 corresponding to the IPC event signal 8 is provided to the receiving IPCT 6*b*.

If the receiving IPCT 6*b* is in the powered off state, the mapping module 10 raises a request through a power management controller within the IC for the receiving IPCT 6*b* to be powered up (step S101). Power requests for the receiving IPCT 6*b* can be sent using asynchronous requests, based only on the configuration of the mapping module 10 and the incoming IPC events 8.

Once the receiving IPCT 6*b* has been powered up, the pending IPC task 9 is registered in the event register 14*b* of the receiving IPCT 6*b*, and remains in the event register 14*b* until cleared by the processor within the second domain 4*b* (step S102). The receiving IPCT 6*b* then asserts an acknowledgement signal (task_ack) 18, which is provided to the mapping module 10. The mapping module 10 forwards the acknowledgement signal 18 to the sending IPCT 6*a* (received as event_ack) via the associated channel. The sending IPCT 6*a* receives the acknowledgement signal (event_ack) 18 from the mapping module 10 and the status register 16*a* for the IPC event 8 in the sending IPCT 6*a* is set from '0' to '1', indicating that the acknowledgement signal (event_ack) has been received. No separate channel of the mapping module 10 is needed for the acknowledgement signal 18.

While the value stored in the status register 16*a* is '0', any further writes to the IPC event register 14*a* of the sending ICPT 6*a* from the CPU of the first domain 4*a* are ignored, and an overflow status bit is set in an overflow register 20*a* of the sending IPCT 6*a*. This informs a user that an overflow has occurred, which can be useful for debugging the system 2. The overflow bit in the overflow register 20*a* stays active until it is cleared. The second domain 4*b* and the third domain 4*c* respectively comprise corresponding overflow registers 20*b*, 20*c* that operate in the same way.

In step S103, the sending IPCT 6*a* de-asserts the IPC event signal 8 in response to the assertion of the acknowledgement signal 18 by the receiving IPCT 6*b*. The assertion of the acknowledgement signal 18 also causes the mapping module 10 to lower the power request for the receiving IPCT 6*b*. The CPU of the first domain 4*a* is configured to check that the value in the status register 16*a* of the sending IPCT is '1' before writing to any of the event registers 14*a* of the sending IPCT 6*a* in order to trigger further IPC tasks 9 in the receiving IPCT 6*b*.

In step S104, the receiving IPCT 6*b* de-asserts the acknowledgement signal (task_ack) 18 in response to the de-assertion of the IPC event signal 8 by the sending IPCT 6*a*. The sending IPCT 6*a* is prevented from raising a further IPC event signal 8 for the receiving IPCT 6*b* until said de-assertion of the acknowledgement signal 18 by the receiving IPCT 6*b* occurs. Once the CPU of the second domain 4*b* has handled the received IPC task 9, the CPU clears the event register 14*b* of the receiving IPCT 6*b*.

Figure 3:
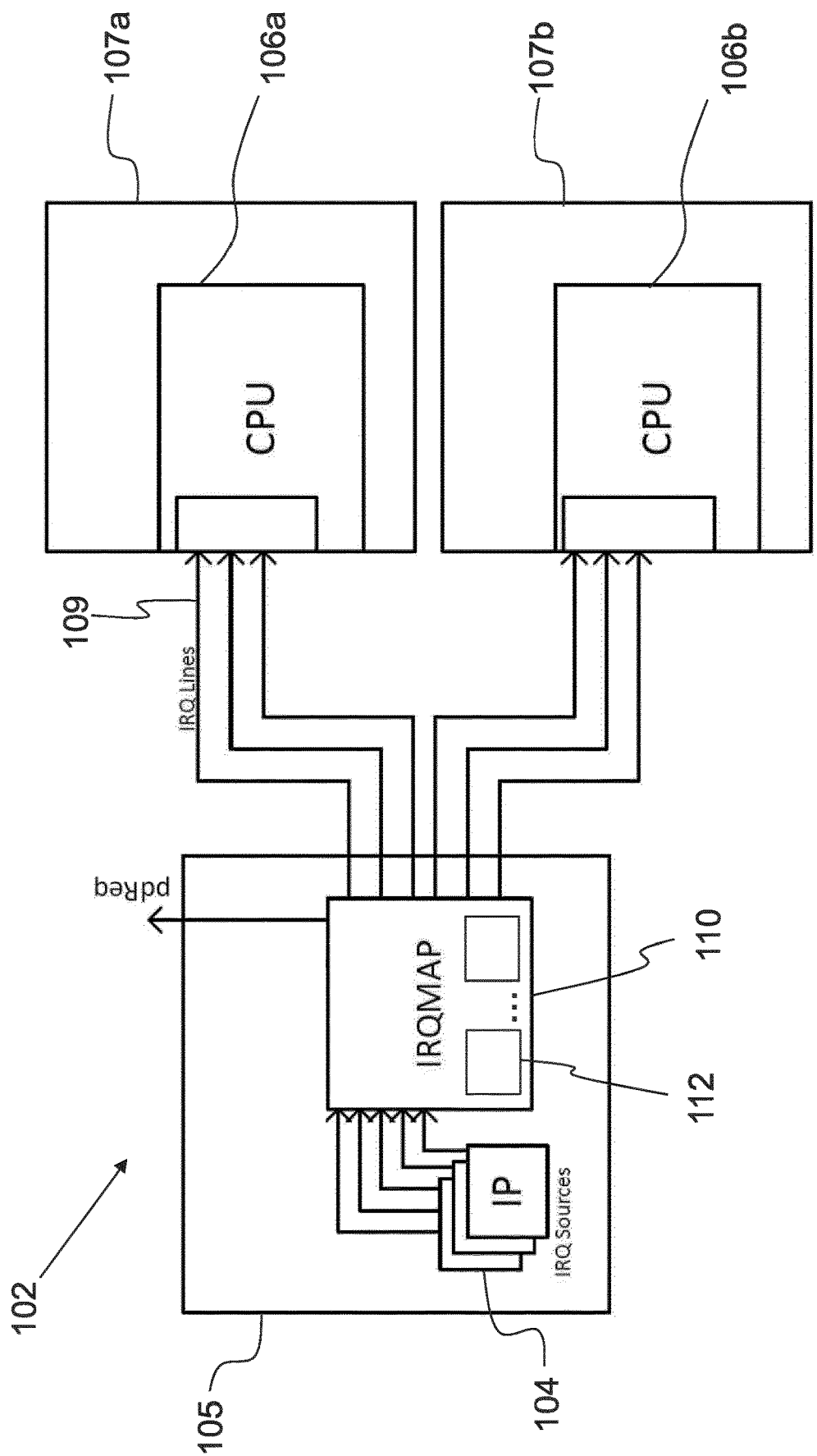
FIG. 3 is a schematic of an interrupt request mapping system in accordance with a further embodiment of the present invention.

FIG. 3 shows a schematic diagram of an interrupt request mapping system in accordance with a further embodiment of the present invention.

The system 102 comprises a plurality of interrupt request sources 104, e.g. peripheral devices, that are located in a peripheral domain 105 and send interrupt requests (IRQ) to a first receiving CPU 106a and a second receiving CPU 106b, each located in a respective domain 107a, 107b, which may be clock or power domains. The system 102 further comprises an interrupt mapping module 110 (IRQMAP) that creates a mapping between all possible IRQ sources 104 in the peripheral domain 105, and a fixed number of IRQ lines 109 to each CPU 106a, 106b.

Similar to the mapping module 10 of FIG. 1, the interrupt mapping module 110 comprises a plurality of configuration registers 112, each corresponding to a respective channel provided by the interrupt mapping module 110. The configuration registers 112 define which interrupt request source 104 is connected to which IRQ line 109.

Interrupt requests are routed to a single domain 106a, 106b. The number of interrupt lines 109, and the degree of freedom in selecting which interrupt request source 104 of the peripheral domain 105 can connect to which IRQ line 109, is set at design stage.

The mapping stored in the configuration registers 112 is configurable so that different interrupt request sources 104 can be connected to different CPUs 106a, 106b in different domains 107a, 107b depending on the application. The configuration is set up statically on boot time, based on peripheral allocation information stored in non-volatile memory. This peripheral allocation information can be configured by a user of the system 102 through a debugger connection before device deployment.

When the interrupt mapping module 110 detects that a domain 107a, 107b has a pending interrupt, a power request for that domain 107a, 107b is raised, as well as for the peripheral domain 105 itself. This power request is held until the interrupt request has been cleared by the interrupt request source 104.

The interrupt request sources 104 in the peripheral domain 105 may be owned by different CPUs 106a, 106b, which may themselves belong to different parties (e.g. a chip manufacturer, a third party software provider, an end application developer). Therefore, the interrupt mapping module 110 provides a mapping between all possible interrupt sources 104 in the peripheral domain 105 and a fixed number of interrupt request lines 109 to each CPU 106a, 106b. However, the interrupt mapping module 110 blocks interrupt signals that are sent to a CPU 106a, 106b from an interrupt request source 104 that is not owned by that CPU 106a, 106b, i.e. each CPU 106a, 106b can only receive interrupts from an interrupt request source 104 that it owns. This helps to prevent other CPUs 106a, 106b from prying on interrupt requests belonging to different CPUs 106a, 106b.

One of the domains is a Secure Domain 107a that is solely responsible for configuring the configuration registers 112 of the interrupt mapping module 110. The configuration of the interrupt mapping module 110 is set by the Secure Domain 107a at boot time. The Secure Domain 107a reads the peripheral allocation memory at boot time to determine the desired resource allocation. A configuration is only considered valid if allocations to not overlap (e.g. two domains laying claim to the same peripheral).

If a different domain 107b needs to modify a configuration register 112 of the interrupt mapping module 110, a service request is sent to the Secure Domain 107a and, if approved, the Secure Domain 107a performs the reconfiguration on behalf of the requesting domain 107b. Reconfiguration requests may be sent according to any suitable bus protocol.

Figure 4:
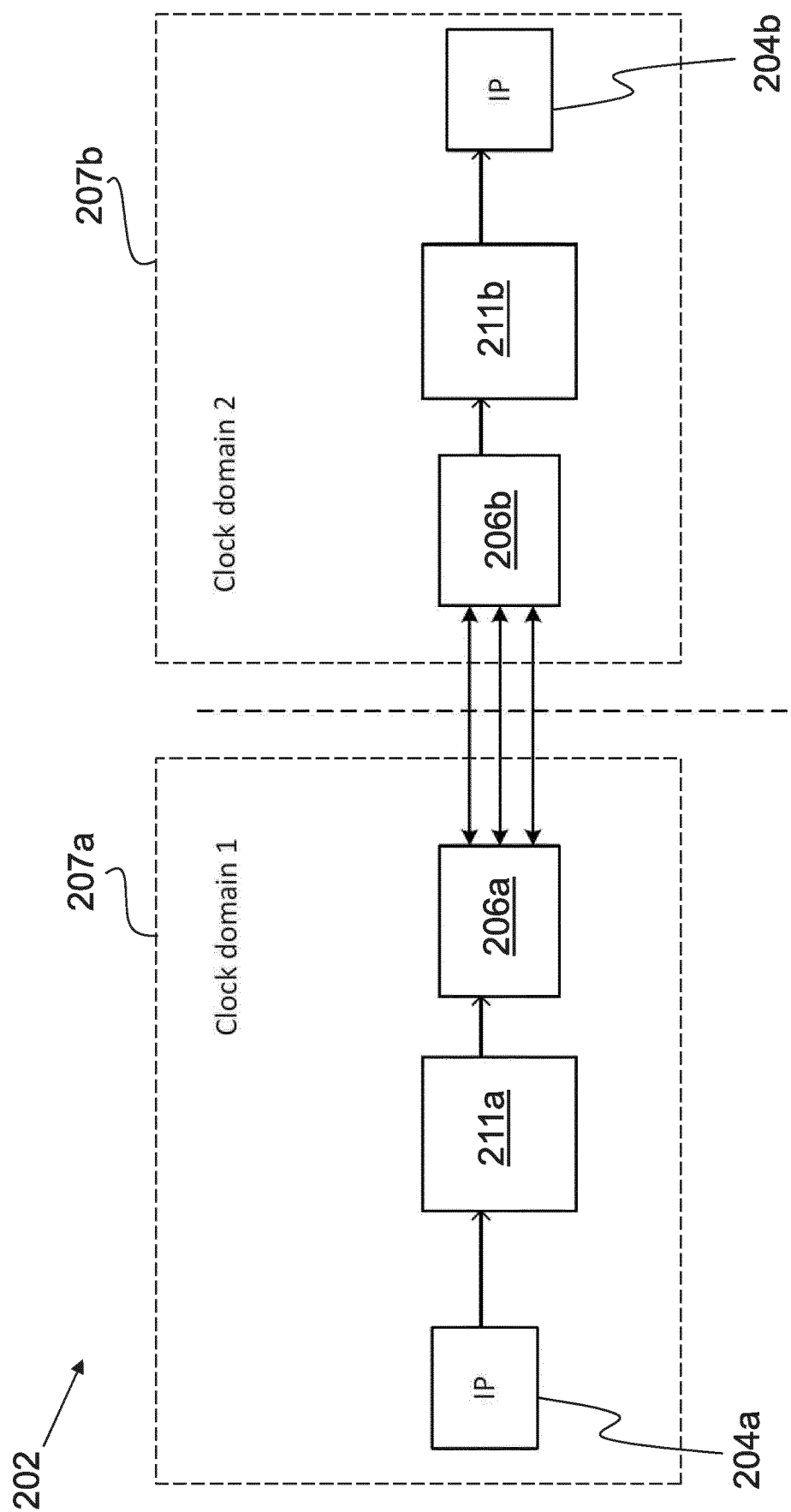
FIG. 4 is a schematic of a peripheral-to-peripheral communication system bridge in accordance with a further embodiment of the present invention.

FIG. 4 shows a schematic diagram of a peripheral-to-peripheral communication system bridge 202 in accordance with a further embodiment of the present invention.

Peripheral-to-peripheral signals are synchronous single-cycle events that may be sent by peripherals 204a, 204b in order to trigger tasks in one or more other peripherals 204a, 204b. The peripheral-to-peripheral communication system bridge 202 of FIG. 4 may be used to send peripheral-to-peripheral events between peripherals 204a, 204b in a first clock domain 207a and a second clock domain 207b respectively, wherein the first and second clock domains 207a, 207b are asynchronous. Peripheral-to-peripheral communication differs from Inter-Processor Communication (IPC) in that there is no CPU involvement.

The system 202 comprises a first peripheral 204a, arranged within the first clock domain 207a, and a second peripheral 204b, arranged within the second clock domain 207b. The first peripheral 204a is connected to a first peripheral-to-peripheral communication system 211a. The second peripheral 204b is connected to a second peripheral-to-peripheral communication system 211b.

The system 202 further includes a peripheral-to-peripheral communication system bridge, which comprises a first bridging module 206a, arranged within the first clock domain 207a, and a second bridging module 206b, arranged within the second clock domain 207b. The first bridging module 206a and the second bridging module 206b are shown in more detail in FIG. 5.

Each bridging module 206a, 206b comprises a handshake module 222a, 222b, a synchroniser circuit 224a, 224b, and an overflow 226a, 226b. The first bridging module 206a is connected to the first peripheral-to-peripheral communication system 211a and sends/receives single-cycle peripheral-to-peripheral tasks/events to and from the first peripheral-to-peripheral communication system 211a. The second bridging module 206b is similarly connected to the second peripheral-to-peripheral communication system 211b.

Figure 5:
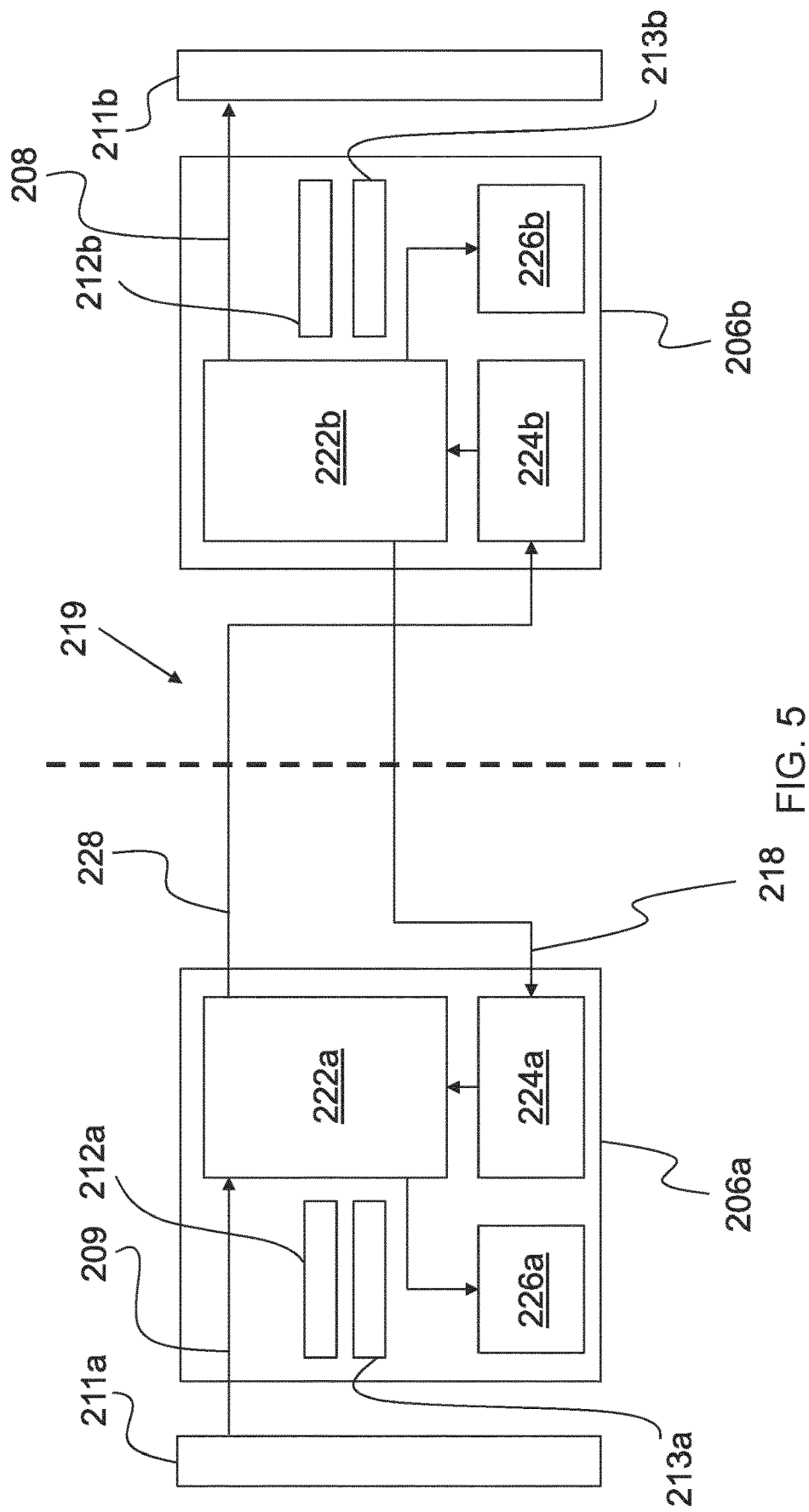
FIG. 5 is a more detailed schematic of the first and second bridging modules of FIG. 4.

Each bridging module 206a, 206b further comprises a consumer register 212a, 212b, and a producer register 213a, 213b, both of which are configurable by user software. The consumer registers 212a, 212b store data for mapping each incoming peripheral-to-peripheral task 209 to a single one of a plurality of unidirectional bridging channels 219 between the first bridging module 206a and the second bridging module 206b. Only one bridging channel 219 is shown in FIG. 5. The producer registers 213a, 213b store data for mapping each unidirectional bridging channel 219 to a local peripheral-to-peripheral communication system channel. The connections between bridging channels 219 and local peripheral-to-peripheral communication system channels are fixed and one-to-one.

The communication of a peripheral event from the first peripheral 204a to the second peripheral 204b will now be described with reference to FIG. 5.

On the source side, the peripheral event in the first peripheral-to-peripheral communication system 211a generates a task 209 in the first bridging module 206a. In response, the handshake module 222a of the first bridging module 206a raises a request signal 228 that is asserted on a bridging channel 219 according to the mapping stored in the consumer register 212a of the first bridging module 206a. Thus, on the source side, the unidirectional bridging channel 219 is configured as a peripheral-to-peripheral signal consumer, subscribing to the same peripheral-to-peripheral communication system channel as that to which the first peripheral 204a publishes.

If the second bridging module 206b is in the powered off state, the handshake module 222a raises a power request (not shown) for the second bridging module 206b to be powered up.

The synchroniser circuit 244b of the second bridging module 206b receives the request signal 228 and synchronises the signal 228 to the local clock of the second domain 207b, before the request signal 228 is provided to the handshake module 222b of the second bridging module 206b. The synchroniser circuit 244b may be a two flip-flop synchroniser circuit, for example.

The handshake module 222b uses the mapping in the producer register 213b of the second bridging module 206b to connect the same unidirectional channel 219 to the peripheral-to-peripheral communication system channel of the second peripheral-to-peripheral communication system 211b to which the second peripheral 204b subscribes, and outputs to this peripheral-to-peripheral communication system channel a single pulse event 208 (embodying an instructing signal) that is clocked to the clock domain of the second domain 207b. Thus, on the receiving side, the unidirectional channel 219 is configured as a peripheral-to-peripheral signal producer.

In response to receiving the request signal 228 on the bridging channel 219, the handshake module 222b of the second bridging module 206b raises an acknowledgement signal 218 that is asserted on the same bridging channel 219.

The acknowledgement signal 218 is synchronised to the clock of the first domain 207a by the synchroniser circuit 224a of the first bridging module 206a, before the acknowledgement signal 218 is provided to the handshake module 222a of the first bridging module 206a. The request signal 228 and the power request signal are held by the first bridging module 206a until the acknowledgement signal 218 is received at the first bridging module 206a.

If the first bridging module 206a attempts to issue a new request signal before the acknowledgement signal 218 has been received, the new request signal will not be sent. Instead, an overflow bit indicating the channel number of the bridging channel 219 is set in the overflow register 226a of the first bridging module 206a. This allows a user to debug situations in which peripheral events are not being received by the second bridging module 206b.

It will be appreciated that the communication of a peripheral event in the reverse direction (i.e. from the second peripheral 204b to the first peripheral 204a) is performed in a similar way.

Multiple peripherals 204a, 204b may publish to the same local peripheral-to-peripheral communication system channel on the source side of the peripheral-to-peripheral communication system bridge 202. Similarly, multiple peripherals 204a, 204b may subscribe to the same local peripheral-to-peripheral communication system channel on the receiving side of the peripheral-to-peripheral communication system bridge 202. This allows multiple connection options between peripherals 204a, 204b in different peripheral-to-peripheral communication systems 211a, 211b, i.e. one-to-one, one-to-many, many-to-one and many-to-many. However, as stated above, the connections between bridging channels 219 and local peripheral-to-peripheral communication system channels are fixed and one-to-one.

Peripheral-to-peripheral communication system channels may belong to different owners. When connecting a peripheral-to-peripheral communication system channel in one peripheral-to-peripheral communication system to a peripheral-to-peripheral communication system channel in another peripheral-to-peripheral communication system, it may be necessary from a security point of view to ensure that the channels have the same owner. The bridge 202 may be configured to determine an owner identification associated with an incoming request to alter the configurations stored in the consumer 212a, 212b and producer registers 213a, 213b and to deny requests from unauthorised parties.

Figure 6:
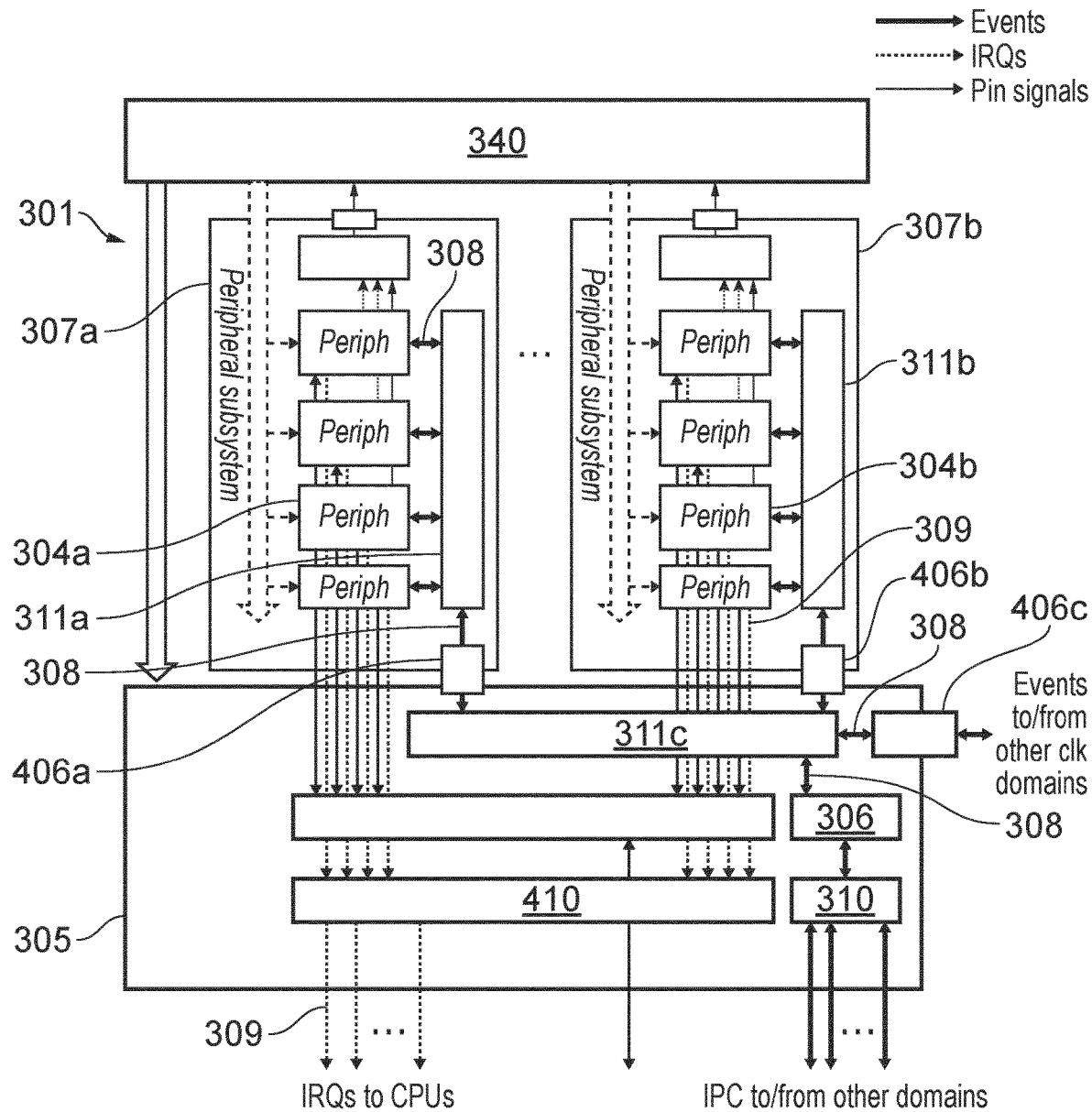
FIG. 6 shows a schematic of an integrated-circuit comprising various communication systems in accordance with embodiments of the present invention.

FIG. 6 shows an exemplary arrangement of an IC 301 incorporating an IPC system, such as the system shown in FIG. 1, an interrupt request mapping system, such as the system shown in FIG. 2, and a peripheral-to-peripheral communication system bridge similar to that shown in FIGS. 4 and 5.

The IC 301 comprises a first peripheral subsystem 307a, a second peripheral subsystem 307b, and a control domain 305, each of which is configured to communicate with a bus interface 340.

The first peripheral subsystem 307a and the second peripheral subsystem 307b respectively contain a first set of peripherals 304a and a second set of peripherals 304b. The first set of peripherals 304a is interconnected via a first peripheral-to-peripheral communication system 311a. The second set of peripherals 304b is interconnected via a second peripheral-to-peripheral communication system 311b.

The control 305 comprises a third peripheral-to-peripheral communication system module 311c, an IPC transceiver 306 an IPC mapping module (EVMAP_0) 310 and an interrupt request mapping module (EVMAP_1) 410.

The first peripheral-to-peripheral communication system 311a communicates with the third peripheral-to-peripheral communication system 311c via a first peripheral-to-peripheral communication system bridge 406a. Thus, it will be appreciated that the first peripheral subsystem 307a and the control domain 305 each comprises a respective one of a pair of bridging modules, as described above with reference to FIGS. 4 and 5, configured to provide a plurality of channels between the first peripheral-to-peripheral communication system 311a and the third peripheral-to-peripheral communication system 311c. A second peripheral-to-peripheral communication system bridge 406b is similarly arranged to provide communication between the second peripheral-to-peripheral communication system 311b and the third peripheral-to-peripheral communication system 311c.

The third peripheral-to-peripheral communication system 311c sends and receives event signals 308 to and from an external peripheral-to-peripheral communication system (not shown) in another domain via a third peripheral-to-peripheral communication system bridge 406c. The third peripheral-to-peripheral communication system 311c also sends and receives IPC event signals 308 to and from other domains (not shown) arranged on the IC 301 via the IPC transceiver 306 and the IPC mapping module 310, which operate as described above with reference to FIGS. 1 and 2.

The peripherals 304a, 304b of the first and second peripheral subsystems 307a, 307b are configured to issue interrupt requests 309 to the interrupt request mapping module 410. The interrupt request mapping module 410 is configured to map the interrupt requests 309 to CPUs in other domains (not shown) in the manner described above with reference to FIGS. 4 and 5.

In one exemplary implementation, the first set of peripherals 304a comprises a timer configured to emit an event signal 308 when a timeout value is reached. This event signal 308 is routed (by means of configuring producer/consumer registers in peripherals and peripheral-to-peripheral communication system bridges 306a, 406b) to a Universal Asynchronous Receiver/Transmitter (UART) peripheral in the second set of peripherals 304b. This causes the UART peripheral to send a series of data signals as part of a data transfer from an output of the IC 301 over a serial interface.

Once the data transfer has been completed, the UART peripheral is configured to generate an interrupt request 309. The interrupt request 309 is routed by the interrupt request mapping module 410 to a CPU in a separate domain (not shown), which is the owner of the UART peripheral and the timer. Other CPUs on the IC 301 are prevented from detecting that the timer has produced the event signal 308, or that the UART peripheral has been activated, or that the interrupt request 309 has been sent.

In this example, the second peripheral subsystem 307b, containing the UART peripheral, might be in a powered down state when the timer issues the event signal 308. In this case, the peripheral-to-peripheral communication system bridge 406b issues a power request for the second peripheral subsystem 307b to be powered up before the event signal 308 is passed on. Furthermore, if the CPU in the separate domain (i.e. the recipient of the interrupt request 309) is also powered down, the interrupt request mapping module 410 issues a power request in response to detecting the interrupt request 309 from the UART peripheral.

Embodiments of the invention therefore allow a system designer to partition resources between CPUs (e.g. between third party developers and IC manufacturers), without requiring peripherals to have hardcoded owner CPUs. This improves flexibility in scenarios in which multiple mutually untrusted code development entities are sharing the same chip.

Embodiments of the invention also allow communication between systems of an IC that are in different power domains or asynchronous clock domains. This means that large clock or power domains (containing a large number of components) are not required, leading to potentially significant power consumption reductions. The present invention can also help to reduce leakage current by allowing unused portions of the IC to be powered down when not needed. This is particularly useful in more complex devices with a large number of peripherals, so devices can be scaled up (i.e. be made more complex) without necessarily dramatically increasing power requirements.

The invention claimed is:

1. A circuit portion comprising:
   a mapping module, comprising a plurality of channels wherein each channel provides a connection for connecting a respective first component of the circuit portion with a respective second component of the circuit portion in a one-to-one relationship, wherein the one-to-one relationship is fixed and wherein the mapping module is configured such that the plurality of channels cannot provide a connection in a one-to-many relationship;
   a source component, arranged in a first clock or power domain, configured to assert an event signal or an interrupt from a set of event signals or interrupts;
   a destination component, arranged in a second clock or power domain, configured to execute a task from a set of tasks; and
   a memory storing a mapping between the set of event signals or interrupts and the set of tasks;
   wherein the mapping module is configured, in response to an assertion of an event signal or interrupt by the source component, to forward the event signal or interrupt to the destination component via only one channel of the plurality of channels so as to cause the destination component to perform a corresponding task according to the mapping stored in the memory.

2. The circuit portion of claim 1, wherein the source component comprises a source peripheral-to-peripheral communication system connected to a plurality of peripheral devices in the first clock or power domain, and the destination component comprises a destination peripheral-to-peripheral communication system connected to a plurality of peripheral devices in the second clock or power domain.

3. The circuit portion of claim 1, wherein the second clock or power domain is different to the first clock or power domain.

4. The circuit portion of claim 1, wherein the destination component is configured to assert an acknowledgement signal in response to the assertion of the event signal or interrupt.

5. The circuit portion of claim 4, wherein the source component is configured, once it has asserted the event signal or interrupt, to continue to assert the event signal or interrupt until the acknowledgement signal is detected.

6. The circuit portion of claim 4, wherein the source component is prevented from asserting a further event signal or interrupt until an assertion and a de-assertion of the acknowledgement signal has been detected.

7. The circuit portion of claim 1, wherein the destination component comprises a destination synchronizer circuit configured to synchronize the event signal to the clock of the second domain.

8. The circuit portion of claim 1, wherein the mapping is configurable such that the event signal or interrupt can be mapped to a different task.

9. The circuit portion of claim 8, wherein the mapping module is arranged in a secure domain comprising a secure configuration component that has permission to configure the mapping stored in memory.

10. The circuit portion of claim 9, wherein the secure configuration component is configured to receive a configuration request from a component in a non-secure domain to configure the mapping stored in memory.

11. The circuit portion of claim 10, wherein the secure configuration component is configured to execute the configuration request by configuring the mapping stored in memory on behalf of the non-secure domain component.

12. The circuit portion of claim 10, wherein the secure configuration component is configured to allow a configuration request in response to determining that an owner of the first clock or power domain is the same as an owner of the second clock or power domain.

13. The circuit portion of claim 1, wherein causing the destination component to perform the task according to the mapping comprises allowing the event signal or interrupt to propagate between the source component and the destination component.

14. The circuit portion of claim 1, wherein the mapping module comprises one or more uni-directional channels for connecting the source component and the destination component.

15. The circuit portion of claim 1, wherein the mapping module is configured to prevent one or more further destination components from receiving the event signal or interrupt.

16. A circuit portion for communicating between two peripheral-to-peripheral communication systems the circuit portion comprising:
   a first peripheral-to-peripheral communication system, configured to provide a source peripheral-to-peripheral communication system channel to a first peripheral configured to assert an event signal from a set of event signals;
   a second peripheral-to-peripheral communication system, configured to provide a sink peripheral-to-peripheral communication system channel to a second peripheral configured to perform a set of tasks;
a first bridging module, connected to the first peripheral-to-peripheral communication system;
a second bridging module, connected to the second peripheral-to-peripheral communication system; and
a memory storing a mapping between the set of event signals and the set of tasks; wherein:
the first bridging module and the second bridging module are connected by a plurality of bridging channels;
the first peripheral-to-peripheral communication system is configured, upon receipt of an event signal on the source peripheral-to-peripheral communication system channel, to output the event signal to the first bridging module; and
the first bridging module and the second bridging module is configured, in response to receiving the event signal, to connect the source channel and the sink channel to only one bridging channel of the plurality of bridging channels in a one-to-one relationship according to the mapping stored in the memory, wherein the one-to-one relationship is fixed and wherein the plurality of bridging channels are configured such that the plurality of bridging channels cannot provide a connection in a one-to-many relationship.

17. The circuit portion of claim 16, wherein the first peripheral-to-peripheral communication system and the second peripheral-to-peripheral communication system are arranged in the same clock or power domain.

18. The circuit portion of claim 16, wherein:
the first bridging module is configured to output a request signal to the second bridging module in response to receiving the event signal;
in response, the second bridging module is configured to assert an instructing signal; and
the second peripheral-to-peripheral communication system is configured, in response to detecting the instructing signal, to cause the second peripheral to perform a task corresponding to the event signal according to the mapping stored in memory.

19. The circuit portion of claim 18, wherein:
the first bridging module is arranged in a first clock domain;
the second bridging module is arranged in a second clock domain; and
the second bridging module comprises a synchronizer circuit configured to synchronize the request signal to a clock of the second clock domain.

20. The circuit portion of claim 16, wherein the first bridging module is configured to allow a configuration request to configure the mapping stored in memory in response to determining that an owner identification associated with the first peripheral-to-peripheral communication system is the same as an owner identification associated with the second peripheral-to-peripheral communication system.

* * * * *